United States Patent
Boerstler et al.

(10) Patent No.: US 7,356,716 B2
(45) Date of Patent: Apr. 8, 2008

(54) SYSTEM AND METHOD FOR AUTOMATIC CALIBRATION OF A REFERENCE VOLTAGE

(75) Inventors: David William Boerstler, Round Rock, TX (US); Eskinder Hailu, Austin, TX (US); Jieming Qi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 11/065,549

(22) Filed: Feb. 24, 2005

(65) Prior Publication Data

US 2006/0190746 A1   Aug. 24, 2006

(51) Int. Cl.
G06F 1/26 (2006.01)
(52) U.S. Cl. ...................... 713/300; 327/540
(58) Field of Classification Search ............... 713/300; 327/540
See application file for complete search history.

(56) References Cited

U.S. PATENT DOCUMENTS

| | | | | |
|---|---|---|---|---|
| 4,827,222 | A | 5/1989 | Hester et al. ............... 330/257 |
| 5,087,872 | A * | 2/1992 | Gupta ......................... 323/340 |
| 5,982,163 | A | 11/1999 | Shinozaki ................... 323/354 |
| 6,184,720 | B1 | 2/2001 | Kim et al. .................... 327/37 |
| 6,194,962 | B1 | 2/2001 | Chen ............................ 330/9 |
| 6,255,895 | B1 | 7/2001 | Kim et al. ................... 327/530 |
| 6,285,258 | B1 | 9/2001 | Ikeuchi et al. .............. 330/288 |
| 6,452,478 | B1 | 9/2002 | Dale ........................... 338/195 |
| 6,749,335 | B2 | 6/2004 | Gauthier et al. ............ 374/172 |
| 6,789,037 | B2 | 9/2004 | Gunther et al. ............. 702/132 |
| 7,102,417 | B2 | 9/2006 | Gordon et al. .............. 327/512 |
| 7,174,144 | B2 * | 2/2007 | Lin ............................. 455/258 |
| 2004/0233600 | A1 | 11/2004 | Yoshida et al. ............... 361/90 |
| 2006/0142977 | A1 * | 6/2006 | Oh et al. ..................... 702/190 |

OTHER PUBLICATIONS

Banba et al., "A CMOS Bandgap Reference Circuit with Sub-1-V Operation," IEEE Journal of Solid-State Circuits, vol. 34, No. 5, May 1999, pp. 670-674.
Song et al., "A Precision Curvature-Compensated CMOS Bandgap Reference," 1983 IEEE International Solid-State Circuits Conference, Feb. 25, 1983, pp. 240-241 and 312.

* cited by examiner

Primary Examiner—Thuan Du
(74) Attorney, Agent, or Firm—VanLeeuwen & VanLeeuwen; D'Ann N. Ritai

(57) ABSTRACT

A system and system for automatic voltage calibration is presented. A voltage calibration system includes three main units, which are a voltage level trimming unit, a trim detection unit, and a trim control unit. The three units work in conjunction with each other during a trimming operation in order to identify a tap voltage that is closest to a target voltage. In one embodiment, the voltage calibration system may be used to calibrate a voltage regulator. Upon commencement of calibration, the voltage regulator's feedback loop is open, and the target voltage is selected as the input for the feedback port of the amplifier. The voltage regulator serves as a voltage comparator that compares each tap voltage to the target voltage. When the calibration is complete, regulator's feedback loop is closed and the closest tap voltage to the target voltage is used as the regulator's input.

5 Claims, 10 Drawing Sheets

| 1004 mV TAPS (mV) | 1066 mV TAPS (mV) | TRIM SETTINGS |
|---|---|---|
| 1004 | 1066 | 0000 |
| 998.98 | 1060.67 | 0001 |
| 993.96 | 1055.34 | 0010 |
| 988.94 | 1050.01 | 0011 |
| 983.92 | 1044.68 | 0100 |
| 978.90 | 1039.85 | 0101 |
| 973.88 | 1034.02 | 0110 |
| 968.86 | 1028.69 | 0111 |
| 963.84 | 1023.36 | 1000 |
| 958.82 | 1018.03 | 1001 |
| 953.80 | 1012.70 | 1010 |
| 948.78 | 1007.37 | 1011 |
| 943.76 | 1002.04 | 1100 |
| 938.74 | 996.71 | 1101 |
| 933.72 | 991.38 | 1110 |
| 928.70 | 986.05 | 1111 |

*Figure 4*

SYSTEM AND METHOD FOR AUTOMATIC CALIBRATION OF A REFERENCE VOLTAGE

BACKGROUND OF THE INVENTION

1. Technical Field

The present invention relates in general to a system and method for automatic voltage calibration. More particularly, the present invention relates to a system and method for automatically calibrating a reference voltage or a voltage regulator based upon a target voltage.

2. Description of the Related Art

Voltage reference circuitry is an important element for microprocessors, DSPs, and analog-to-digital conversion applications. When a device's voltage is scaled down to a low voltage level, a challenge found is achieving an accurate low voltage reference using traditional bandgap reference (BGR) topologies. Even though an adequate low voltage reference that is independent of temperature and supply voltage variations may be achieved using a BGR topology, a "process" variation component has become a major part of voltage reference err among reverence voltage PVT (process/voltage/temperature) variations. Factors that contribute to process variation are MOSFET mis-matching, which includes "no-zero" OPAMP offset voltage and current mirror mismatching, resistor variation, and diode variation.

Existing art may provide ways to reduce voltage reference err caused by process variation, such as using a centroid layout technique to reduce the local mismatch between passive and active components. However, a challenge found with this technique is that is does not help global mismatches caused by cross-wafer process variation. Another approach to reduce voltage reference err caused by process variation is to use an "auto-zero" technique to eliminate OPAMP offset voltage. However, a challenge found with this technique is that the technique is difficult to implement and, furthermore, the reference voltage is unavailable during sampling periods. Another approach to reduce process variation voltage reference errs is to use manufacturing "trimming." A challenge found with this technique, however, is that it may increase manufacturing costs if the technique is not an automated process.

Similarly, voltage regulators use a reference voltage for regulating power that is provided to applications such as cell-phones, analog-to-digital converters, and on-chip power management of DSPs and microprocessors. A conventional voltage regulator includes a high gain err amplifier, a series power transistor, and a feedback network. The accuracy of such a voltage regulator is largely dependent upon the reference voltage. With today's processes scaling down to sub 90 nm regions, and supply voltages scaling down to below 1V, a challenge found is providing an accurate reference voltage at these levels.

Traditionally, voltage trimming has been used to obtain the desired temperature independent characteristics of a voltage regulator's reference voltage. However, as discussed above, process variation has become a major contributor of voltage reference err. Due to process variations, the reference voltage may have unacceptable three-sigma variations in a device. In principle, traditional voltage trimming may be used to solve process variation problems. However, a challenge found with this approach is that the traditional trimming method is a high cost and time consuming process and thus, is typically avoided in large volume, low cost applications.

What is needed, therefore, is a system and method to calibrate a reference voltage in a cost effective manner for use in production environments.

SUMMARY

It has been discovered that the aforementioned challenges are resolved using a system and method that automatically steps through multiple tap voltages and identifies a tap voltage that correlates with a target voltage. A voltage calibration system includes three main units, which are a voltage level trimming unit, a trim detection unit, and a trim control unit. The three units work in conjunction with each other during an automatic trimming operation in order to identify a tap voltage that is closest to the target voltage. Once the trimming operation completes, the voltage calibration system uses the identified tap voltage as a reference voltage, which it provides to device circuitry.

The voltage calibration system initializes, which resets a counter and registers to zero. The counter is located in the trim control unit, which the trim control unit passes the counter's output, or "trim control counter value," to the voltage level trimming unit. In turn, the voltage level trimming unit uses the trim control counter value to select a particular tap voltage on its resistor divider network and output the tap voltage to a comparator. The trim control counter increments on each clock cycle, thereby instructing the voltage level trimming unit to select different tap voltages on each clock cycle.

The comparator compares the different tap voltages to a target voltage until the trim control counter reaches its maximum value. At some point during the automated trimming operation, the tap voltage levels "cross over" the target voltage. For example, if the tap voltage levels begin at a higher voltage than the target voltage, the tap voltage levels become lower than the target voltage at a particular trim control counter value. The comparator outputs an analog value for each tap voltage into a level shifter, which converts the analog values into a digital format. For example, the level shifter may generate a "1" when the tap voltage is greater than the target voltage, and may generate a "0" when the tap voltage is less than the target voltage.

The level shifter's output feeds into a shift register that is located in the trim detection unit. The size of the shift register corresponds to the number of tap voltages of the voltage level trimming unit's resistor divider network. For example, if the resistor divider network includes sixteen tap voltages, the shift register may be sixteen bits in length. Using this example, at initialization, the shift register's value may be "0000 0000 0000 0000." In one embodiment, the shift register may be set to all "1's" and, in this embodiment, the value of the shift register at initialization may be "1111 1111 1111 1111."

Once the trim control counter increments to its maximum value, the selection of the tap voltage switches from the trim control counter value to a "final trim setting," which corresponds to the point at which a particular tap voltage crossed over the target voltage. The trim detection unit generates the final trim setting by using a leading zero detector to analyze its shift register values in order to identify the cross-over point. In turn, the voltage level trimming unit uses the final trim setting to select the particular tap voltage and provide the tap voltage to device circuitry.

In one embodiment described herein, the voltage calibration procedure may be used to calibrate a voltage regulator. In this embodiment, the voltage regulator's feedback loop is open, and the target voltage is selected as the input for the feedback port of the amplifier. In this operational mode, the voltage regulator serves as a voltage comparator, and each tap voltage is compared to the target voltage. When the calibration is complete, the regulator's feedback loop closes, and the regulator uses the tap voltage that is closest to the target voltage as a reference voltage.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 4 is a table showing tap voltages that are output from a voltage level trimming unit;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
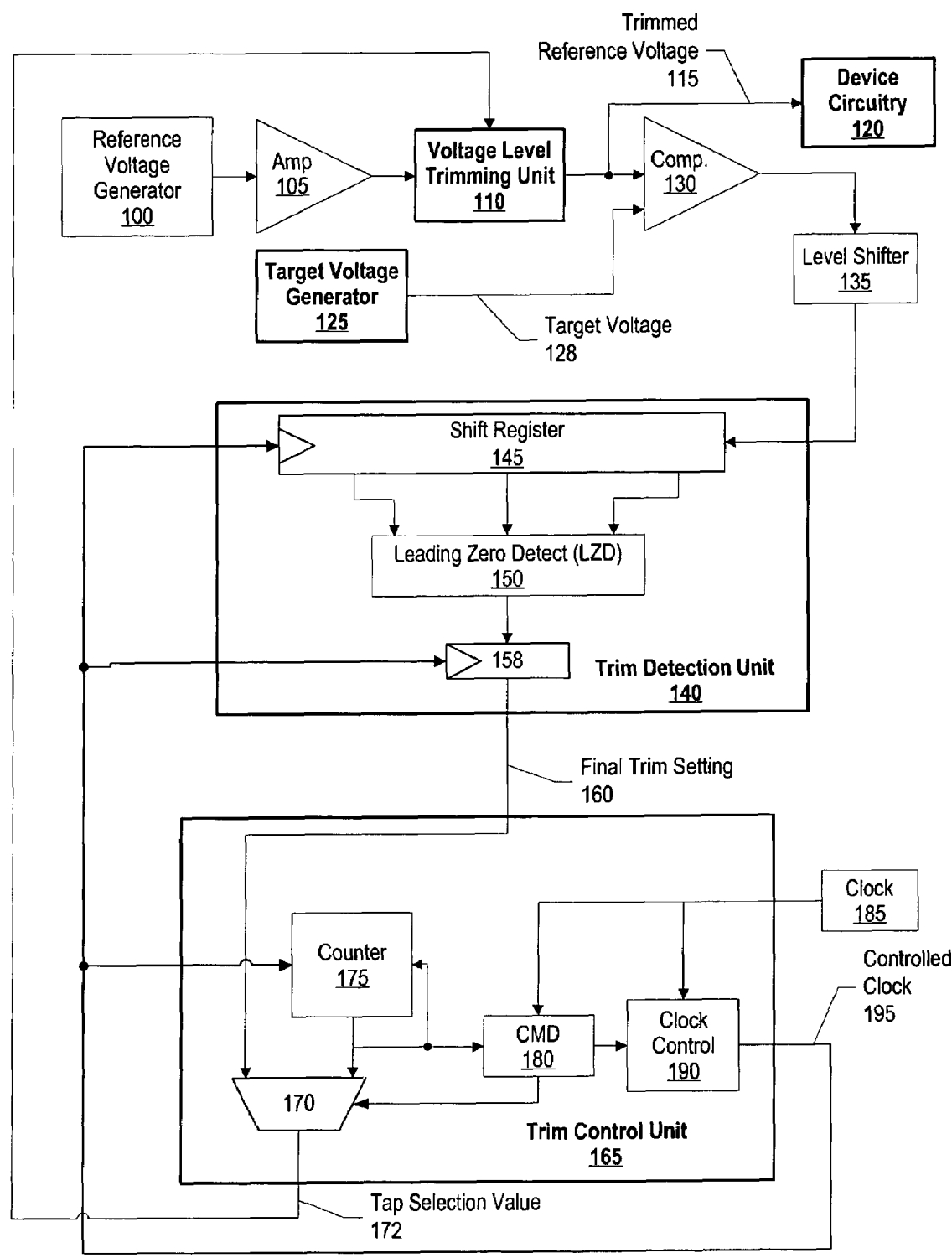
FIG. 1 is a diagram showing a reference voltage trimming configuration for the invention described herein.

FIG. 1 is a diagram showing a reference voltage trimming configuration for the invention described herein. FIG. 1 includes three main units, which are voltage level trimming unit 110, trim detection unit 140, and trim control unit 165. The three units work in conjunction with each other during a trimming operation in order to identify a tap voltage that is closest to a target voltage. Once the trimming operation completes, voltage level trimming unit 110 uses the identified tap voltage as a reference voltage that it provides to device circuitry 120.

Upon initialization, a trim control counter (i.e. counter 175), shift register 145, and register 158 are reset to "0." Counter 175's output is input to multiplexer 170. For example, if counter 175 is a four-bit counter, its output is "0000." Count to maximum detector (CMD) 180 provides control to multiplexer 170. At this point, CMD 180 instructs multiplexer 170 to use counter 175's input as its output. Therefore, using the example described above, multiplexer 170's output, or tap selection value 172, is "0000," which is input to voltage level trimming unit 110.

Reference voltage generator 100 generates a reference voltage output that is input to amplifier 105. Amplifier 105 amplifies the reference voltage such that the amplified reference voltage is larger than a target trimmed voltage (i.e. target voltage 128). The amplified reference voltage is input to voltage level trimming unit 110. Voltage level trimming unit 110 includes a resistor divider network that uses amplifier 105's output to produce multiple tap voltages. Voltage level trimming unit 110 also includes a multiplexer that uses tap selection value 172 to select particular tap voltages from the resistor divider network (see FIG. 2 and corresponding text for further details regarding voltage level trimming unit 110 properties).

Voltage level trimming unit 110's output, or trimmed reference voltage 115, is input to comparator 130. Target voltage generator 125 produces target voltage 128, which is also input to comparator 130. Target voltage generator 125 may include a power supply and a precision resistor divider. Comparator 130 compares target voltage 128 with trimmed reference voltage 115, and outputs a comparison value, which is an analog result. The analog result is input to level shifter 135, which converts the analog result into a digital format. For example, level shifter 135 may generate a "1" when trimmed reference voltage 115 is greater than target voltage 128, and may generate a "0" when trimmed reference voltage 115 is less than target voltage 128. Level shifter 135's output is input to shift register 145 that is located in trim detection unit 140.

The size of shift register 145 corresponds to the number of tap voltages of voltage level trimming unit 110's resistor divider network. For example, if the resistor divider network has sixteen tap voltages, shift register 145 may be sixteen bits in length. Using this example, at initialization, shift registers 145' value may be "0000 0000 0000 0000." In one embodiment, shift registers 145 may be set to all "1's" and, in this embodiment, the value of shift registers 145 at initialization may be "1111 1111 1111 1111."

Upon commencement of the trimming operation, clock 185 provides a clock to count to maximum detector (CMD) 180 and clock control 190. Clock control 190 passes controlled clock 195 to counter 175, shift registers 145, and register 158. On each clock cycle, counter 175 increments and provides its value to multiplexer 170. For example, if counter 175 is a four-bit counter, counter 175's output is 0000, 0001, 0010, 0011, 0100, etc. Multiplexer 170 passes these signals (tap selection value 172) to voltage level trimming unit 110. As discussed above, voltage level trimming unit 110 uses tap selection value 172 to select and output particular tap voltages to comparator 130 (i.e. trimmed reference voltage 115).

Comparator 130 continues to compare trimmed reference voltage 115 to target voltage 128 until counter 175 reaches its maximum value. At some point during the trimming operation, trimmed reference voltage 115 "crosses over" target voltage 128. Meaning, if trimmed reference voltage 115 begins at a higher voltage, trimmed reference voltage 115 becomes lower than target voltage 128 at a particular tap voltage that corresponds to a particular value of tap selection value 172 (see FIG. 3 and corresponding text for further details regarding tap voltage level changes). Level shifter 135 outputs a different value at the point at which trimmed reference voltage 115 crosses over target voltage 128. For example, if level shifter 135 begins to output "0's," level shifter 135 begins outputting a "1" at the point when trimmed reference voltage 115 crosses over target voltage 128.

Once counter 175 reaches its maximum value, CMD 180 sends a signal to clock control 190, which gates off controlled clock 195. CMD 180's signal also switches multiplexer 170's input selection to final trim setting 160. At this point, shift register 145 includes a series of 1's and 0's, whereby the point at which the string changed from 1 to 0 is the point at which the trimmed reference voltage 115 crossed over target voltage 128. For example, shift registers 145 value may be "1111 1111 1111 1000."

LZD 150 uses the value of shift registers 145, and generates an output based upon the point at which the 1's changes to 0's. Using the example described above, LZD 150 generates the value of "0000 0000 0000 0100" or an encoded value of 1101. For example, a decoded value of "B0, B1, B2, B3," and an encoded value of "A0, A1" may be derived from each other using a simple algorithm such as:

| Decoding Algorithm | Encoding Algorithm |
| --- | --- |
| B0 = not A0 AND not A1 | A0 = B2 OR B3 |
| B1 = not A0 AND A1 | A1 = B1 OR B3 |
| B2 = A0 AND not A1 | |
| B3 = A0 AND A1 | |

LZD 150 outputs the encoded value to register 158, which results in final trim setting 160 that is input to multiplexer 170. Since CMD 180 switched multiplexer 170's input selection to select final trim setting 160, multiplexer 170 provides the value of final trim setting 160 to voltage level trimming unit 110 via tap selection value 172. As a result, voltage level trimming unit 110 provides a trimmed reference voltage (trimmed reference voltage 115) to device circuitry 120 based upon final trim setting 160.

Figure 2:
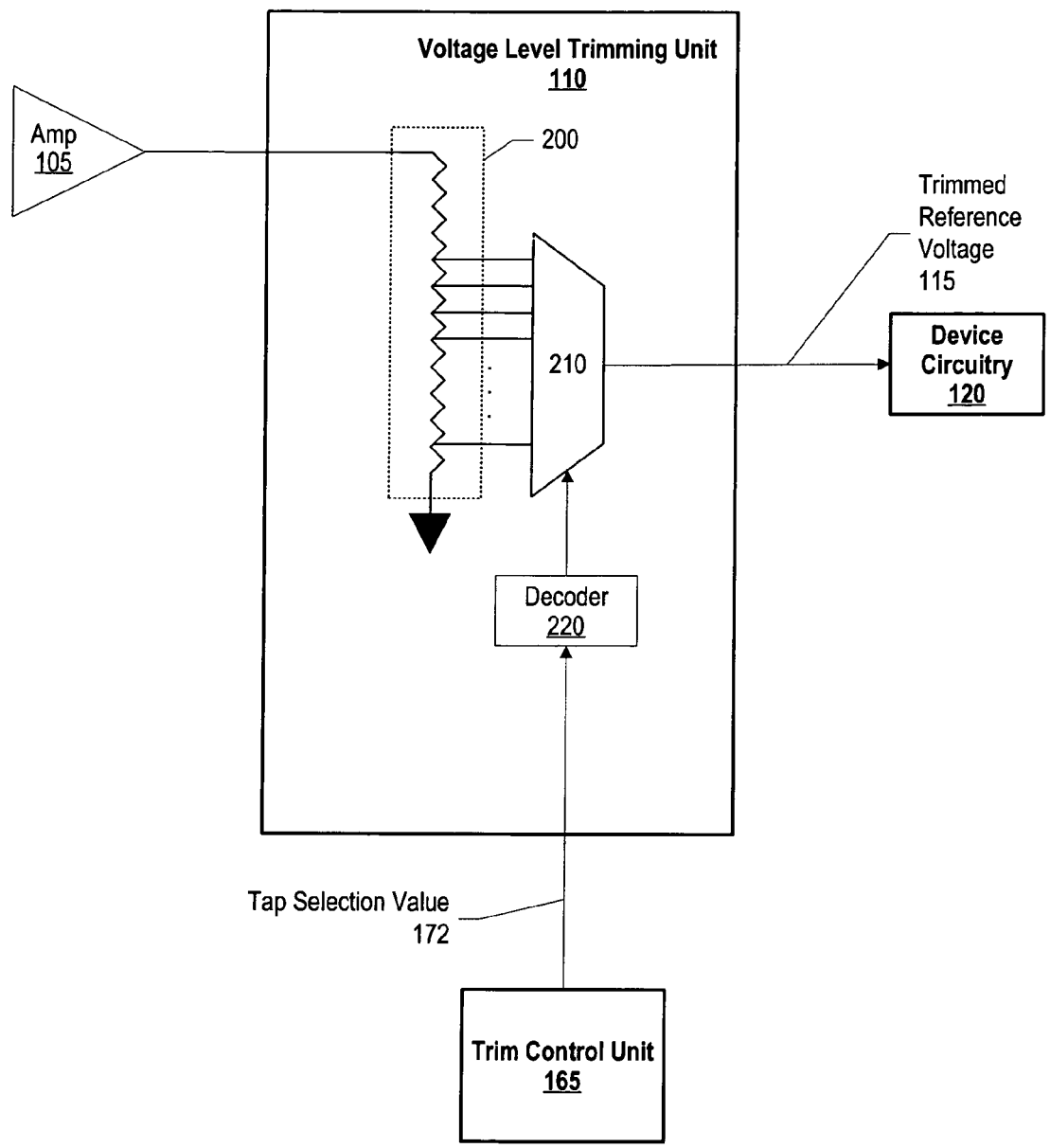
FIG. 2 is a diagram of a voltage level trimming unit for use in trimming a reference voltage.

FIG. 2 is a diagram of a voltage level trimming unit for use in trimming a reference voltage. Voltage level trimming unit 110 receives an amplified voltage level from amplifier 105, and provides a trimmed reference voltage (trimmed reference voltage 115) to device circuitry 120 based upon results of a trimming operation. Voltage level trimming unit 110, amplifier 105, and device circuitry 120 are the same as that shown in FIG. 1.

Voltage level trimming unit 110 includes resistor divider 200, multiplexer 210, and decoder 220. Resistor divider 200 provides multiple tap voltages to multiplexer 210. The difference in the voltage level of the tap voltages are based upon the number of tap voltages and the voltage range that resistor divider 200 covers (see FIG. 3 and corresponding text for further details regarding resistor divider properties).

Trim control unit 165 provides tap selection value 172 to decoder 220 which, in turn, decodes the signals and provides control signals to multiplexer 210. Trim control unit 165 increments tap selection value 172 until a counter included in trim control unit 165 reaches its maximum value. During the trimming operation, multiplexer 210 selects different tap voltages from resister divider 200 based upon tap selection value 172, thereby providing different voltage levels on trimmed reference voltage 115. Trim control unit 165 and tap selection value 172 are the same as that shown in FIG. 1.

Once trim control unit 165 finishes the trimming operation, trim control unit 165 provides a final trim setting through tap selection value 172 that corresponds to an identified tap voltage that is closest to a target voltage. In turn, multiplexer 210 selects the identified tap voltage and provides the tap voltage to device circuitry 120 through trimmed reference voltage 115 once the trimming operation is complete.

Figure 3:
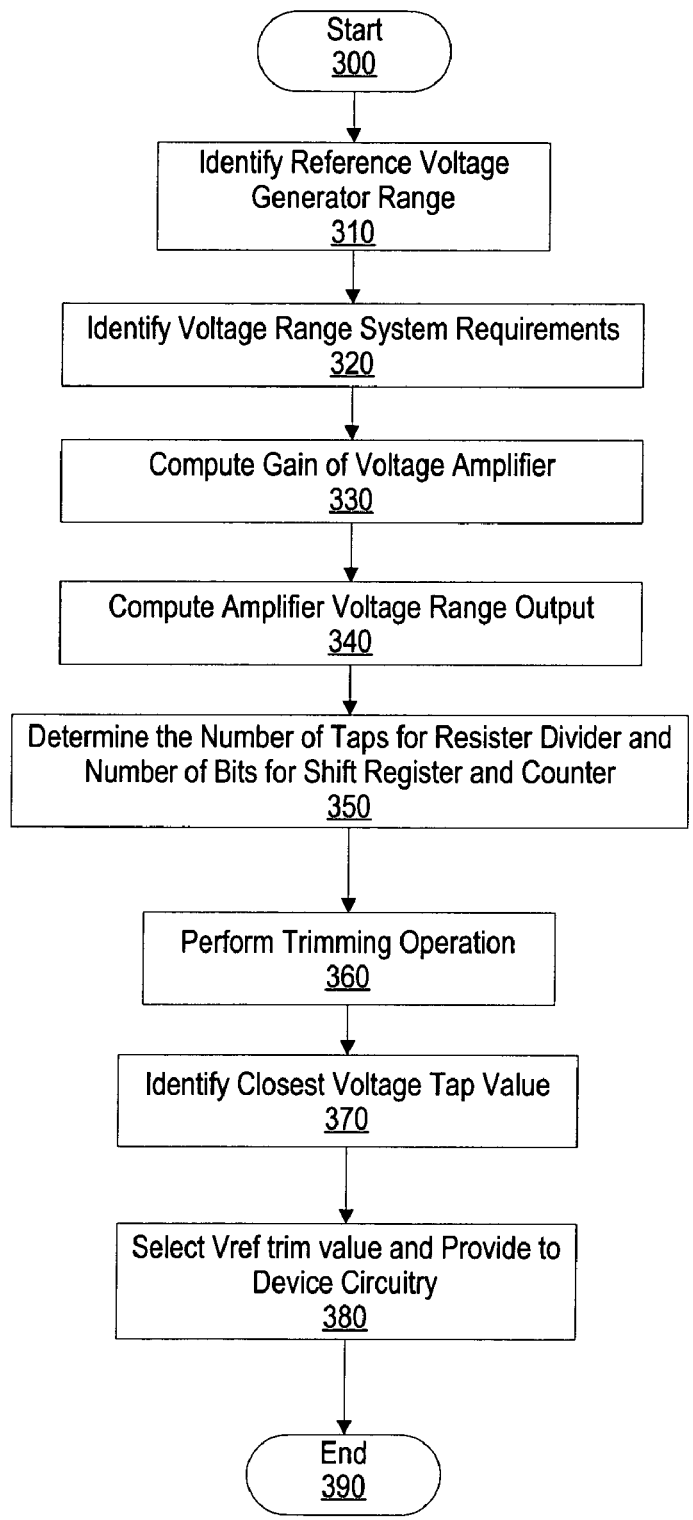
FIG. 3 is a flowchart showing steps taken in identifying design characteristics of voltage level trimming circuitry.

FIG. 3 is a flowchart showing steps taken in identifying design characteristics of voltage level trimming circuitry. Processing commences at 300, whereupon processing identifies a voltage range of a reference voltage generator. For example, a reference voltage generator may have a three sigma process/voltage/temperature (PVT) variation of 30 mV for a 1V target reference voltage. At step 320, processing identifies a voltage range system requirement. Using the example described above, a system may require a reference voltage variation of 5 mV.

A system may include a voltage amplifier that is used to amplify the reference voltage if it is lower than a target voltage such that the amplified voltage is greater than the target voltage. At step 330, processing calculates the desired gain of the voltage amplifier. Using the example described above, the three sigma value of the reference voltage generator is be between 970 mV and 1030 mV. To amplify 970 mV to 1V, the voltage gain of the voltage amplifier should be at least 1.031. A much larger gain is not desirable, however, since this would increase the number of tap voltages for the voltage level trimming unit. At step 340, processing determines the voltage amplifier's output. Using the example described above and using a voltage gain of 1.031, the voltage amplifier's output ranges from a minimum of 1004 mV to a maximum of 1066 mV.

Processing's next step is to determine the number of voltage taps for a level trimming unit and the number of bits for the counter. Using the example described above, based on an accuracy of 5 mV, the trim level step may be chosen to be around 5 mV. Based on the voltage range (1004mV to 1066mV) from the voltage amplifier, which is 62 mV, at least 13 voltage taps are required. Therefore, sixteen voltage taps, a four-bit counter, and a sixteen bit shift register are sufficient for the example described above. As such, using the example described above, the voltage level trimming unit has a voltage resolution of 0.5% and minimal voltage tap steps of 5.02 mV and 5.33 for an amplifier voltage of 1004 mV and 1066 mV, respectively (see FIG. 4 and corresponding text for further details regarding voltage tap levels for the example described in FIG. 3).

Figure 5:
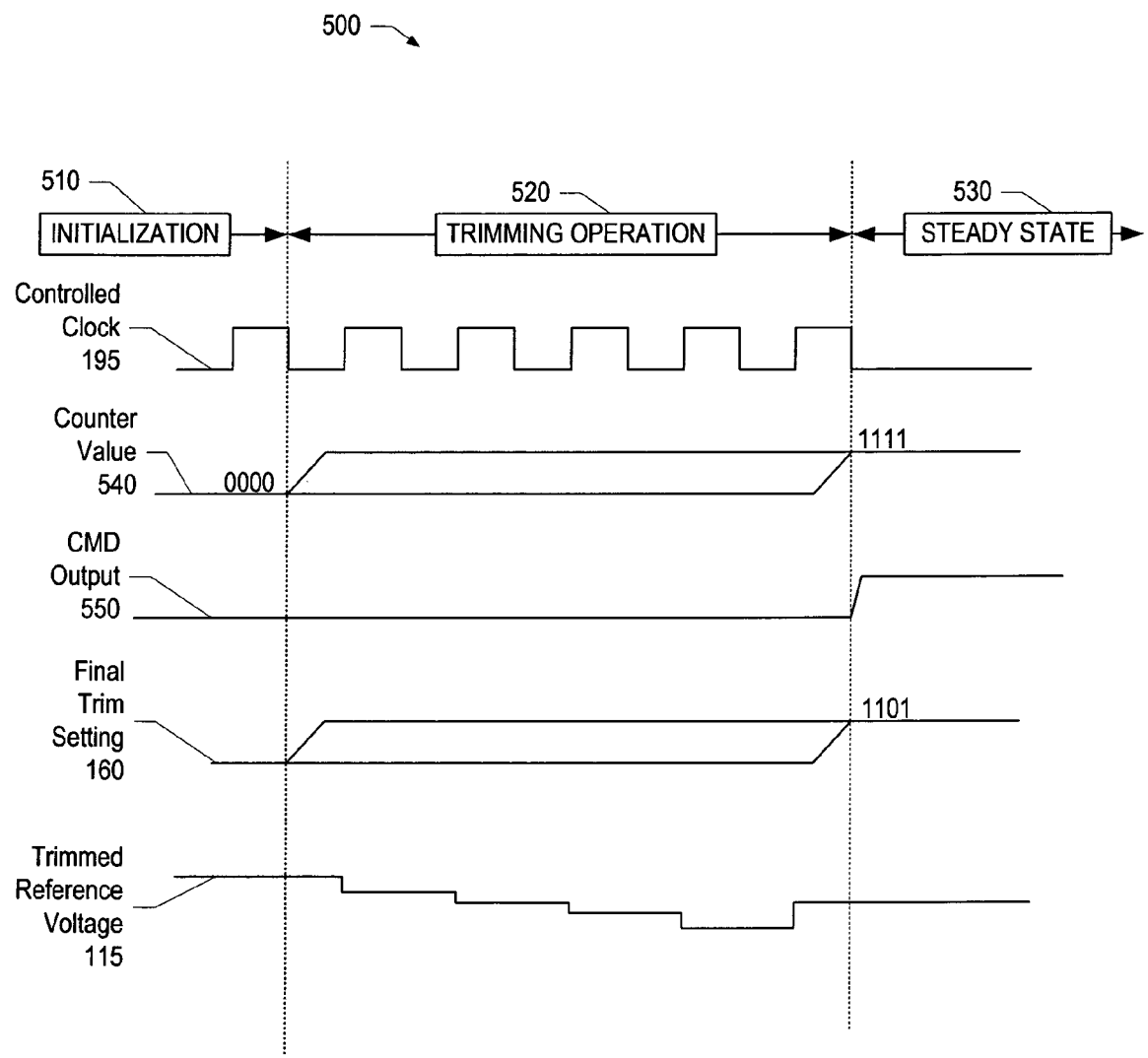
FIG. 5 is a timing diagram showing voltage reference trimming modes of operation.

At step 360, processing performs a trimming operation using the trimming circuitry that is configured in step 350 (see FIGS. 1, 2, 5, and corresponding text for further details regarding trimming operations). Processing identifies a closest voltage tap to a target voltage based upon the trimming operation results at step 370, and provides the identified voltage tap output to device circuitry at step 380. Processing ends at 390.

FIG. 4 is a table showing tap voltages that are output from a voltage level trimming unit. FIG. 2 shows voltage level trimming unit 110 that includes resistor divider 200. The number of tap voltages of resistor divider 200 are determined by a required voltage increment value and the voltage range that resistor divider 200 covers.

Using the example discussed in FIG. 3's corresponding text, the minimal step for the resistor divider configuration is 5.02 mV and 5.33 for a minimum input voltage of 1004 mV and a maximum input voltage of 1066 mV, respectively. FIG. 4 includes table 400 that shows the resistor divider voltage tap levels for the expected minimum and maximum input voltages. Column 410 includes voltage tap levels for the resistor divider when it receives a minimum input voltage of 1004 mV, and column 420 includes voltage tap levels for the resistor divider when it receives a maximum input voltage of 1066 mV. Column 430 includes respective trim settings that are input to a multiplexer that selects one of the voltage tap levels.

During trimming operations, each of the voltage tap levels are compared against a target reference voltage (see FIG. 1 and corresponding text for further details regarding trimming operation). Using the example described above, if during the trimming operation, 1004 mV was input to the resistor divider network, the trimming operation would determine that the value in row 440 is closest in matching the target reference voltage and, therefore, a trim setting of "0001" is used to select "998.98 mV" as a trimmed reference voltage once the trim operation is complete. Likewise, if during the trimming operation, 1066 mV was input to the resistor divider network, the trimming operation would determine that the value in row 450 is closest in matching the target reference voltage and, therefore, a trim setting of "1101" is used to select "996.71 mV" as a trimmed reference voltage once the trim operation is complete.

FIG. 5 is a timing diagram showing voltage reference trimming modes of operation. Diagram 500 includes three points in time that corresponding to a trimming procedure, which are initialization time 510, trimming operation time 520, and steady state time 530.

At initialization time 510, registers, shift registers, and counters are reset. Counter value 540 corresponds to the output of counter 175 that is shown in FIG. 1. As can be seen, at initialization time, counter value 540 is zero. Upon commencement of trimming operation time 520, the counter increments its value on each cycle of controlled clock 195, until the counter reaches its maximum value of "1111," which completes trimming operation time 520. During trimming operation time 520, the value of trimmed reference voltage 115 is based upon counter value 540. Controlled clock 195 and trimmed reference voltage 115 are the same as that shown in FIG. 1.

At the completion of trimming operation 520, trim detection unit 140 (shown in FIG. 1) identifies a final trim setting value (i.e. final trim setting 160). In addition, a count to maximum detector's output (i.e. CMD output 550) changes to true, which instructs trim control unit 165 (shown in FIG. 1) to pass final trim setting 160 to voltage level trimming unit 110 (also shown in FIG. 1). In turn, voltage level trimming unit 110 outputs a trimmed reference voltage on trimmed reference voltage 115 during steady state time 530.

Figure 6:
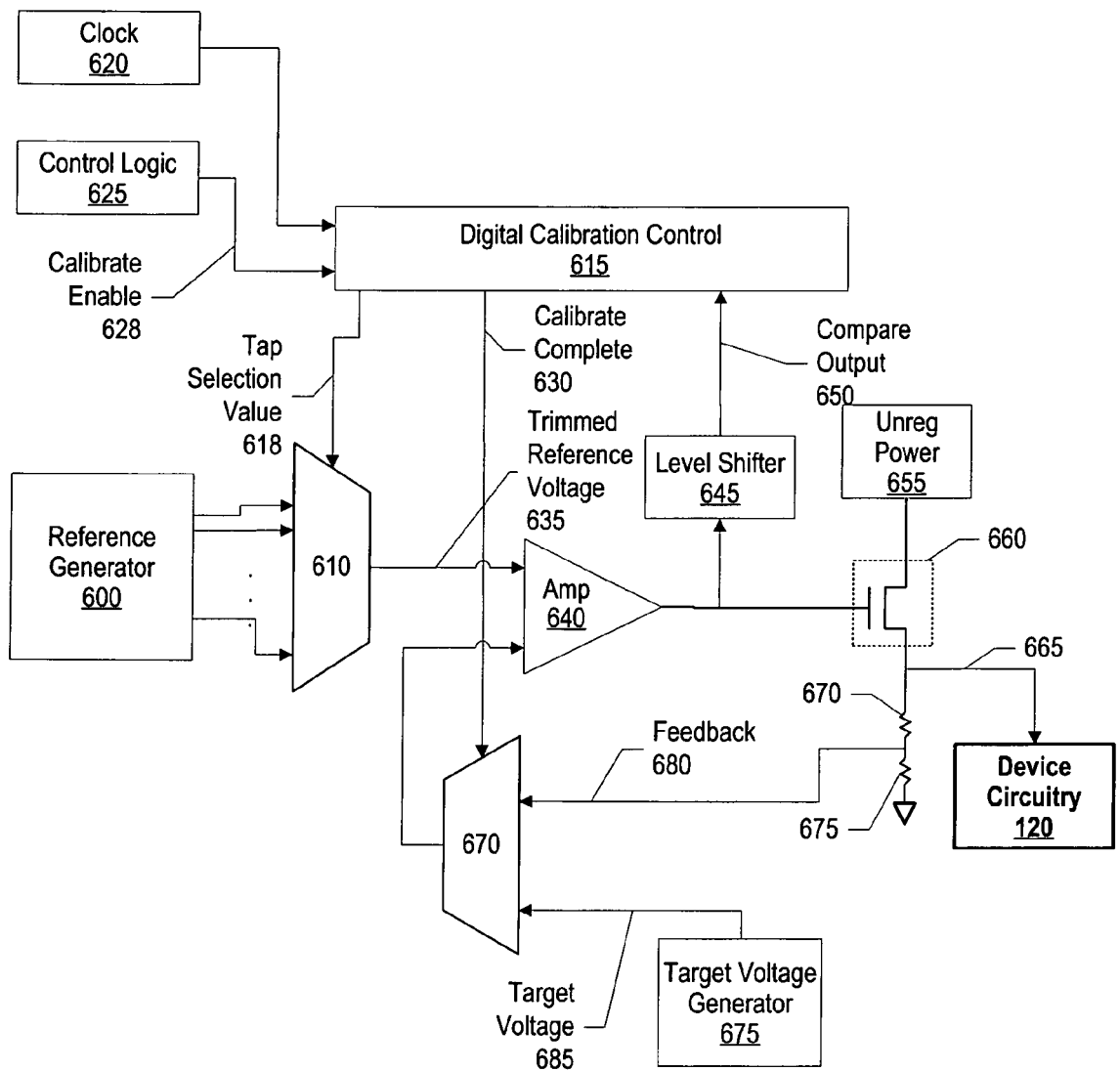
FIG. 6 is a diagram showing a voltage regulator that includes process variation calibration circuitry.

FIG. 6 is a diagram showing a voltage regulator that includes process variation calibration circuitry. FIG. 6 incorporates many of the components, and their functionality, of the voltage trimming circuitry that is shown in FIG. 1. In addition, several functions are used for process calibration including two analog multiplexers for reference voltage and feedback voltage, a level shifter for analog-to-digital conversion, and a digital control circuit to generate multiplexer select signals.

Reference generator 600 provides multiple tap voltages to multiplexer 610. Reference generator 600 may include reference voltage generator 100 and amplifier 105 that are shown in FIG. 1, along with resistor divider 200 that is shown in FIG. 2. Multiplexer 610 selects one of reference generator 600's tap voltage based upon the value of tap selection value 618 that it receives from digital calibration control 615. Digital calibration control 615 uses clock 620 and control logic 625 to increment a counter, which increments tap selection value 618 through a calibration procedure (see FIG. 7 and corresponding text for further details regarding digital calibration control properties).

During the calibration procedure, calibrate done 630 is low, which instructs multiplexer 670 to pass target voltage 685 to amplifier 640 as a "feedback reference voltage." Target voltage generator 675 produces target voltage 685, which may be a power supply and a precision resistor divider network. In this mode, amplifier 640 serves as a voltage comparator between trimmed reference voltage 635 and target voltage 685.

Amplifier 640 compares each of reference generator 600's tap voltages to target voltage 685. Level shifter 645 converts amplifier 640's comparison to a digital signal "0" or "1," and the comparison results (i.e. compare output 650) are provided to digital calibration control 615. At the end of the calibration procedure, digital calibration control 615 identifies reference generator 600's tap voltage that is closest to target voltage 685, and instructs multiplexer 610 to select the identified tap voltage via tap selection value 618. In addition, at the completion of the calibration procedure, digital calibration control 615 sets calibrate complete 630 to high, which instructs multiplexer 670 to pass feedback 680 through to amplifier 640. Feedback 680 is based upon the value of resistors 670 and 675, which are used in the feedback loop for amplifier 640.

In turn, amplifier 640 amplifies trimmed reference voltage 635, which is closest to target voltage 685, and provides the amplified signal to transistor 660. Transistor 660 uses the amplified signal to regulate an unregulated power source (unregulated power 655). The regulated voltage, or regulated power 665, is provided to device circuitry 120 during steady state operation. Device circuitry 120 is the same as that shown in FIG. 1.

Figure 7:
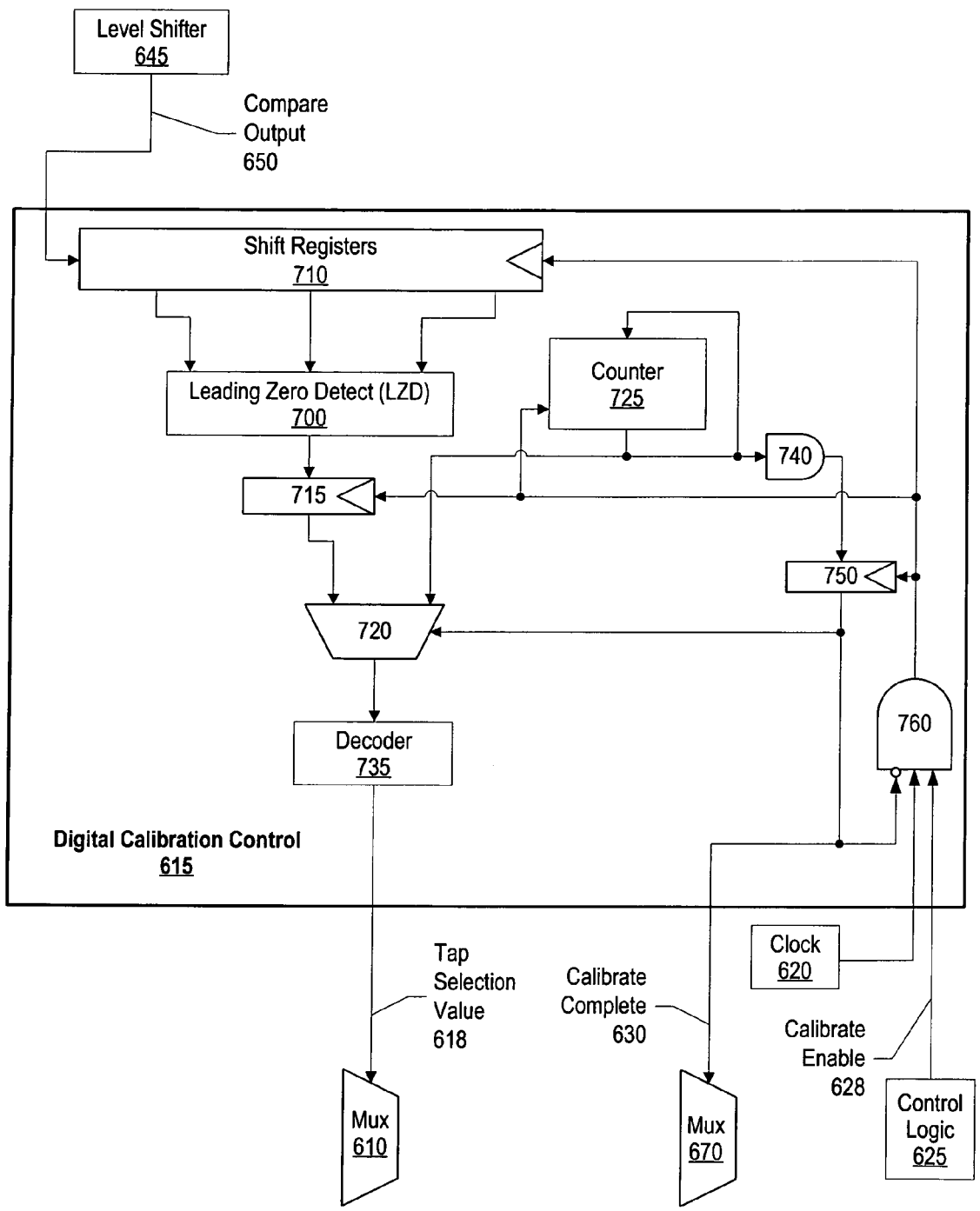
FIG. 7 is a diagram showing a digital calibration control for use in calibrating a voltage regulator.

FIG. 7 is a diagram showing a digital calibration control for use in calibrating a voltage regulator. Digital calibration control 615 receives input from level shifter 645, clock 620, and control logic 625, and provides tap selection value 618 and calibrate complete 630 to multiplexers 610 and 670, respectively. Digital calibration control 615, level shifter 645, clock 620, and control logic 625 are the same as that shown in FIG. 6.

During a calibration procedure, clock 620 provides a clock to gate 760, and control logic 625 sets calibrate enable 628 to true. In addition, counter 725 is reset to zero and, therefore, gate 740's output is zero. As such register 750's output is also zero, causing calibrate complete 630 to be zero. Therefore, gate 760's output value follows clock 620 and can be thought of as a controlled clock, such as controlled clock 195 that is shown in FIG. 1. As the calibration procedure continues, counter 725 increments on each clock cycle, and its output is fed into multiplexer 720. Multiplexer 720 passes counter 725's output to decoder 735, which controls a reference voltage tap selection using multiplexer 610 through tap selection value 618. During the calibration procedure, values are input to shift registers 710 from level shifter 645 via compare output 650. Compare output 650, tap selection 615, calibrate enable 628, calibrate complete 630, multiplexer 610 and 670 are the same as that shown in FIG. 6.

When counter 725 reaches its maximum value, such as "1111" for a four-bit counter, gate 740's output becomes high, causing register 750's output to be high. As such, calibrate complete 630 becomes high, gate 760's output becomes low, and multiplexer 720 switches from passing counter 725's output to decoder 735 to passing register 715's output to decoder 735. Register 715 receives an encoded value from leading zero detect 700, whereby the encoded value corresponds to the value that is stored in shift registers 710. As such, after the calibration procedure is complete, tap selection value 618 provides selection values to multiplexer 610 that correspond to a point at which level shifter 645 detected the closest tap voltage to a target voltage.

Figure 8:
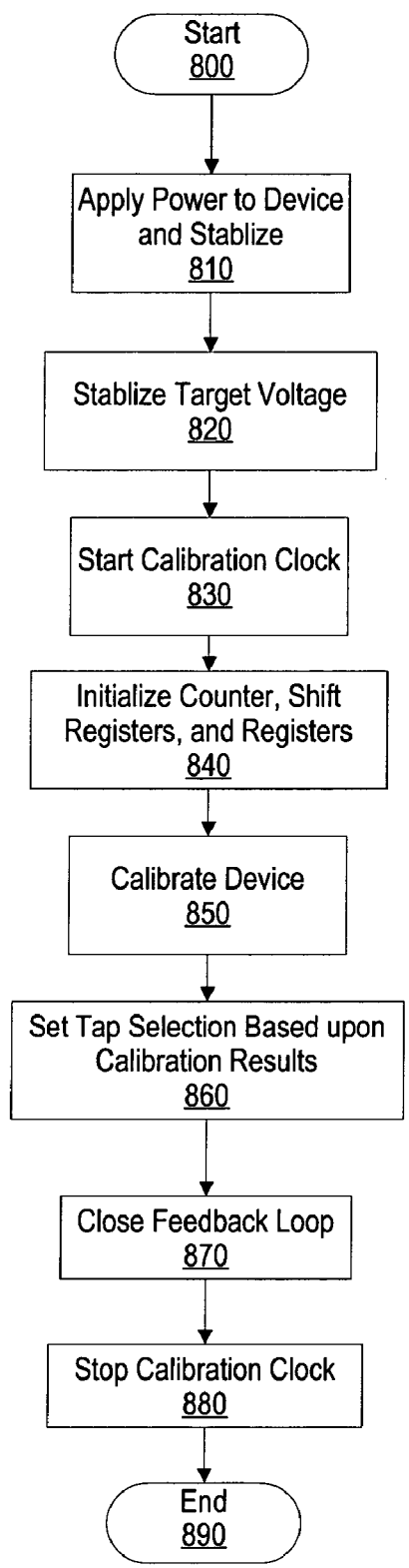
FIG. 8 is a flowchart showing steps taken in automatically calibrating a voltage regulator.

FIG. 8 is a flowchart showing steps taken in automatically calibrating a voltage regulator. A regulator functions in two modes of operation, which are a calibration mode and steady state mode. The calibration mode is performed as part of power-on-reset sequence. By increasing the number of tap voltages from a reference voltage generation circuit, an accurate reference voltage for a regulator may be produced with little process distribution that is caused by OPAMP offset, diode ideality variation, or device mismatching.

Calibration processing commences at 800, whereupon power is applied to the calibration device (step 810). At step 820, processing stabilizes a target voltage that is used to calibrate the device, such as target voltage 685 that is shown in FIG. 6. Processing starts a calibration clock at step 830 that is used to increment a counter during the calibration operation, such as clock 620 that is shown in FIG. 6. Processing initializes a counter, a shift register, and a register at step 840 and, at step 850, processing performs a calibration procedure. During the calibration procedure, the calibration circuitry steps though tap voltages and identifies the tap voltage whose value is closest to a target voltage (see FIGS. 6, 7, and corresponding text for further details).

Once calibration is complete, processing selects the identified tap voltage to use as a reference voltage based upon the calibration results (step 860). In addition, processing closes an amplifier feedback loop at step 870, and stops the calibration clock at step 880 (see FIG. 6 and corresponding text for further details regarding the feedback loop). Processing ends at 890.

Figure 9:
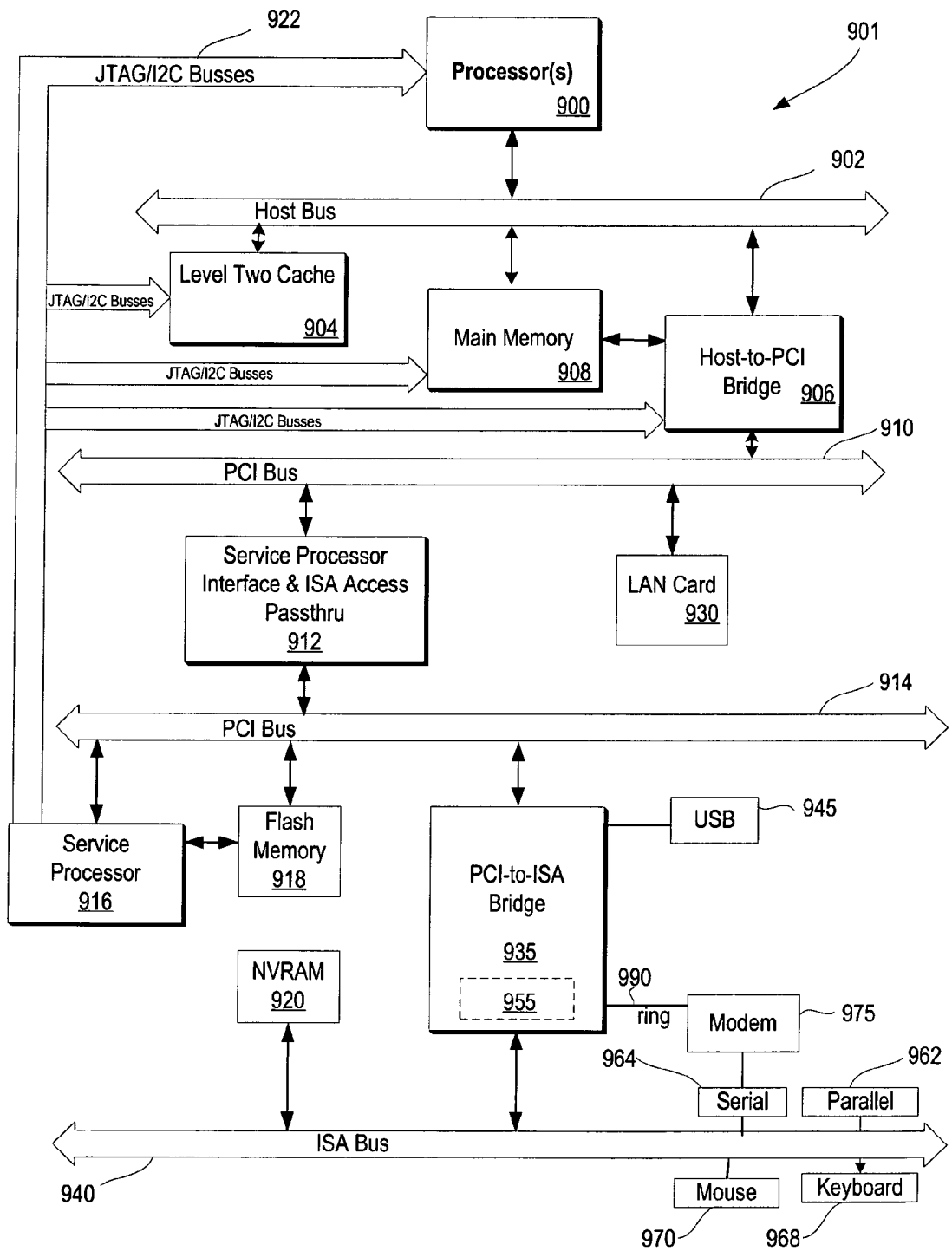
FIG. 9 illustrates a block diagram of a computer system capable of performing the computing operations described herein.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 975 is connected to serial port 964 and PCI-to-ISA Bridge 935.

Figure 10:
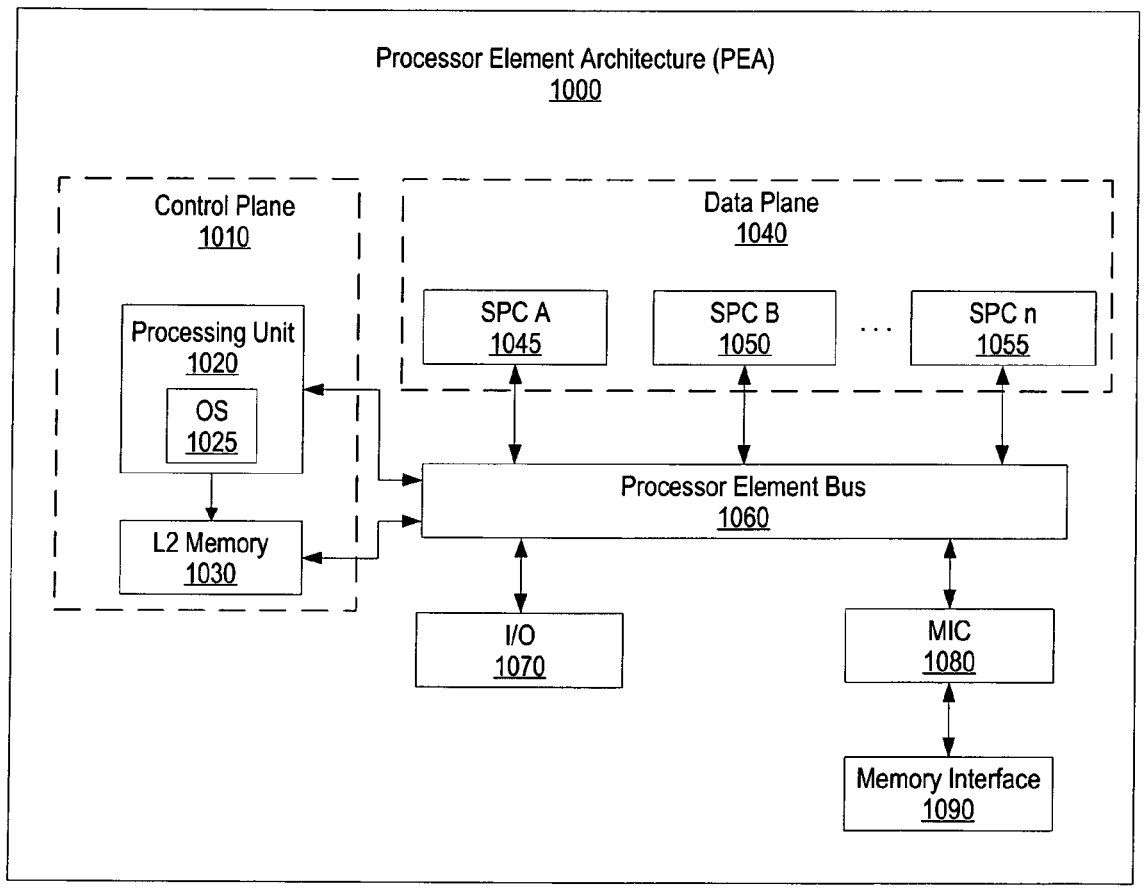
FIG. 10 is a block diagram of a second computing device capable of implementing the present invention.

FIG. 10 is a block diagram of a second computing device capable of implementing the present invention. The architecture shown in FIG. 10 includes heterogeneous processors that share a common memory and a common bus. Processor element architecture (PEA) 1000 sends and receives information to/from external devices through input output 1070, and distributes the information to control plane 1010 and data plane 1040 using processor element bus 1060. Control plane 1010 manages PEA 1000 and distributes work to data plane 1040. In addition, processor element bus 1060 provides read and write requests to memory interface controller (MIC) 1080. Memory interface controller 1080 communicates the requests to memory interface 1090 that, in turn, communicates with external memory.

Control plane 1010 includes processing unit 1020, which runs operating system (OS) 1025. For example, processing unit 1020 may be a Power PC core that is embedded in PEA 1000 and OS 1025 may be a Linux operating system. Processing unit 1020 manages a common memory map table for PEA 1000. The memory map table corresponds to memory locations included in PEA 1000, such as L2 memory 1030 as well as non-private memory included in data plane 1040.

Data plane 1040 includes Synergistic Processing Complexes (SPC) 1045, 1050, and 1055. Each SPC is used to process data information and each SPC may have different instruction sets. For example, PEA 1000 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU), which is a processing core, such as a digital signal processor, a microcontroller, a microprocessor, or a combination of these cores.

SPC 1045, 1050, and 1055 are connected to processor element bus 1060, which passes information between control plane 1010, data plane 1040, and input/output 1070. Bus 1060 is an on-chip coherent multi-processor bus. Input/output 1070 includes flexible input-output logic, which dynamically assigns interface pins to input-output controllers based upon peripheral devices that are connected to PEA 1000. For example, PEA 1000 may be connected to two peripheral devices, such as peripheral A and peripheral B, whereby each peripheral connects to a particular number of input and output pins on PEA 1000. In this example, the flexible input-output logic is configured to route PEA 1000's external input and output pins that are connected to peripheral A to a first input-output controller and route PEA 1000's external input and output pins that are connected to peripheral B to a second input-output controller.

While the computer system described in FIGS. 9 and 10 are capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   identifying a target voltage;
   incrementing a trim control counter value, wherein each incremented trim control counter value selects one of a plurality of tap voltages:
   using each of the incremented trim control counter values to compare each of the plurality of tap voltages to the target voltage;
   in response to comparing each of the plurality of tap voltages to the target voltage, detecting whether one or more of the plurality of tap voltages is at a higher voltage level than the target voltage, the detecting resulting in a plurality of comparison values;
   storing the plurality of comparison values in a shift register;
   determining which one of the plurality of tap voltages correlates to the target voltage based upon the plurality of comparison values, the determining resulting in a trimmed reference voltage; and
   providing the trimmed reference voltage to one or more devices.

2. The method of claim 1 further comprising:
   detecting when the trim control counter has reached its maximum value;
   identifying a point at which the stored comparison values change value in response to detecting that the trim control counter has reached its maximum value, the identified point corresponding to a final trim setting value; and
   using the final trim setting value as the trimmed reference voltage.

3. The method of claim 1 wherein the trimmed reference voltage regulates an unregulated power supply, the method further comprising:
   selecting the target voltage as a feedback reference voltage;
   identifying that the trim control counter has reached its maximum value;
   using a final trim setting value to select the trimmed reference voltage in response to identifying that the trim control counter has reached its maximum value; and
   selecting the trimmed reference voltage as the feedback reference voltage in response to identifying that the trim control counter has reached its maximum value.

4. The method of claim 1 further comprising:
   identifying a reference voltage generator range;
   identifying a voltage range system requirement; and
   calculating a number of plurality of tap voltages based upon the reference voltage generator range and the voltage range system requirement.

5. The method of claim 1 wherein the trimmed reference voltage is provided to a processing element architecture.

* * * * *